United States Patent

[11] 3,590,272

[72] Inventor Belur Venkatachar Keshavan
Laurel, Md.
[21] Appl. No. 762,478
[22] Filed Sept. 25, 1968
[45] Patented June 29, 1971
[73] Assignee Westinghouse Electric Corporation
Pittsburgh, Pa.

[54] MIS SOLID-STATE MEMORY ELEMENTS UNITIZING STABLE AND REPRODUCIBLE CHARGES IN AN INSULATING LAYER
6 Claims, 2 Drawing Figs.

[52] U.S. Cl. 307/304, 317/234 UA, 317/235 B, 307/238
[51] Int. Cl. H01c 7/14
[50] Field of Search 317/235, 21.1, 46; 307/238, 304; 340/173; 117/215, 217

[56] References Cited

UNITED STATES PATENTS 3,475,234 10/1969 Kevwin et al. 317/235

FOREIGN PATENTS 1,452,389 8/1966 France 317/235

OTHER REFERENCES

APPLIED PHYSICS LETTERS, " Evidence of Hole Injection and Trapping in Silicon Nitride Films Prepared by Reactive Sputtering" by Hu et al. 1 Feb. 1967 pages 97— 99

*Primary Examiner*—Jerry D. Craig
*Attorneys*—F. Shapoe, C. L. Menzemer and G. H. Telfer

ABSTRACT: A solid state memory element next provided in an MIS structure. Charges in the insulator layer are reproducibly and stably controlled with respect to bias potential applied across the metal and semiconductor layers. The direction of the bias potential variation is of a polarity to effect turn on of P-channel MIS transistors. In a preferred form the memory element employs as the insulator a first layer of silicon dioxide next to the semiconductor, a layer of silicon nitride, and a second layer of silicon dioxide.

WITNESSES
Edwin E. Bassler
James F. Young

INVENTOR
Belur V. Keshavan
BY
Gordon H. Telfer
ATTORNEY

MIS SOLID-STATE MEMORY ELEMENTS UNITIZING STABLE AND REPRODUCIBLE CHARGES IN AN INSULATING LAYER

BACKGROUND OF THE INVENTION

1. Field of the Invention

This invention relates to semiconductor devices and particularly to MIS devices having metal-insulator-semiconductor structures.

2. Description of the Prior Art

The present invention is a modification of the subject matter contained in copending application Ser. No. 722,639, filed Apr. 19, 1968 by Szedon, Chu and Sack and assigned to the assignee of the present invention and now abandoned. That application describes solid-state memory elements that exhibit among other desirable qualities nonvolatile memory storage for long periods, but with the capability of being modified quickly. The device comprises an MIS structure with means for establishing a reproducible hysteresis loop in the change of the net charge in the insulator as compared with the metal to semiconductor voltage. The state of the insulator charge may be read by charge responsive means in the semiconductor body such as the channel current of an MIS transistor.

In some forms of the invention therein particularly described by way of example the insulator included a first layer portion adjacent the semiconductor of silicon dioxide and a subsequent layer of silicon nitride adjacent the metallic gate electrode. When such a structure is operated with bias potential across the metal and semiconductor over a range of positive and negative values, the net charge in the insulator layer, as indicated, for example, by the flat band voltage of the structure which is the metal to semiconductor voltage required to cancel the effect of insulator charge and give a zero value of the normal electric field component at the semiconductor surface, exhibits a unique characteristic. This characteristic has a first portion of substantially constant insulator charge for positively increasing bias, $V_{MS}$, up to a critical value of $V_{MS}$ (called $V_C$), a second portion of substantially linearly increasing insulator charge with positively increasing $V_{MS}$ above $V_C$, to an arbitrary maximum value of $V_{MS}$ below the breakdown voltage of the insulator layer, a third portion of substantially constant net insulator charge for less positive, and more negative $V_{MS}$, compared with maximum $V_{MS}$, down to a negative critical value of $V_{MS}$ (called $V_{C'}$ ), and a fourth portion of decreasing net insulator charge with $V_{MS}$ more negative than $V_{C'}$ until the net insulator charge is the same as the first portion of the characteristic.

Such a structure permits operation of a memory element by storing information through the change of the net charge in the insulator produced by increasing the bias potential between the metal and semiconductor positively or negatively from a first bias potential to a second value by passing through either a positive or negative critical voltage value at which change in net charge occurs. Modifying is performed by changing the bias potential reversely through a range of algebraic values like that applied in the storing step.

There are instances in which it is desirable to establish the hysteresis loop characteristic curve in an MIS memory element by proceeding through initially more negative values of the bias potential with the slope of the linear portions of the curves being of opposite direction than that of elements wherein the insulator comprises a single silicon dioxide layer and a silicon nitride layer.

SUMMARY OF THE INVENTION

Among the objects of the invention are to provide an MIS memory element with a characteristic curve for variation of the net charge in the insulator layer with respect to changes in bias potential across the semiconductor body and electrode layer that has a configuration of a leftward leaning hysteresis loop that may be established by applying initially increasing negative voltages to a critical value below which charged storage occurs. The state of the insulator charge is read by charge responsive means in the semiconductor body such as the channel current of an MIS transistor.

A preferred form of the invention is one in which the insulator is disposed on a semiconductor material such as silicon and includes a first layer portion adjacent the silicon of silicon dioxide, a layer of silicon nitride and a subsequent layer of silicon dioxide adjacent the metallic gate electrode. Such a structure is found to have a characteristic curve that includes a first portion of substantially constant net insulator charge for negatively increasing bias potential, $V_{MS}$, down to a critical value, $V_C$, of $V_{MS}$, a second portion of substantially linearly increasing net insulator charge with negatively increasing $V_{MS}$ to an arbitrary maximum negative value of $V_{MS}$ below the breakdown voltage of the insulator layer, a third portion of substantially constant net insulator charge for more positive, and less negative $V_{MS}$ compared with the maximum $V_{MS}$ up to a positive critical value, $V_{C'}$ of $V_{MS}$, a fourth portion of decreasing net insulator charge with more positive $V_{MS}$ than $V_{C'}$ until the net insulator charge is the same as the first portion.

The invention permits providing oppositely polarizable memory elements in the same structure with the individual elements as above-described being particularly suitable for use in a P-channel enhancement mode MIS transistor wherein the negative polarizing voltage to effect charge storage is the same polarity as the potential required to turn on P-channel device. This may therefore have advantages in circuit applications of such devices.

DESCRIPTION OF THE PREFERRED EMBODIMENTS

Figure 1:
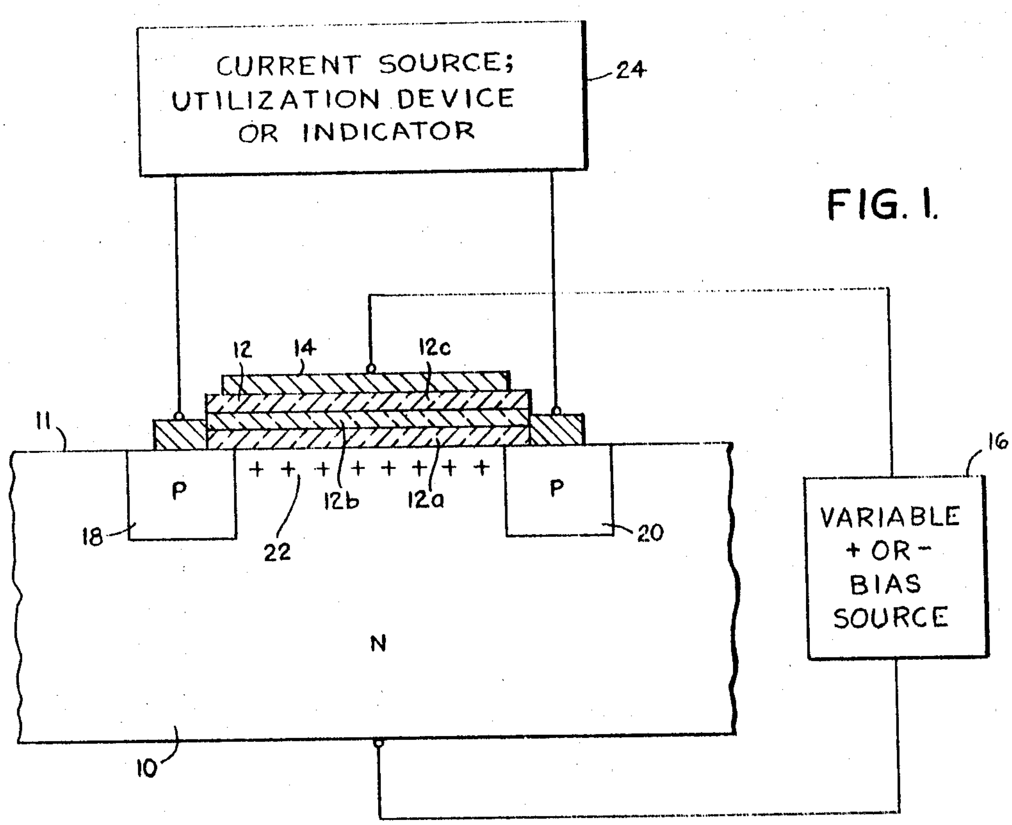
FIG. 1 is a sectional view of one embodiment of an MIS device in accordance with this invention with schematically illustrated circuit elements.

FIG. 1 shows an MIS structure including a body of semiconductor material having a surface 11. An insulator layer 12 is on surface 11. An electrode layer 14 is on the insulator layer 12 remote from the semiconductor 10.

A bias potential source 16 is connected across the electrode layer 14 and the semiconductor 10. The bias source 16 is one that is controllably variable over a range of positive and negative values so that by reason of the properties of the insulator 12 variation of the bias source induces in the insulator 12 a reproducible hysteresis loop in the net insulator charge versus metal to semiconductor voltage characteristic curve.

Within the semiconductor body 10 is a means that is electrically responsive to changes in the insulator charge. In this example this means includes the elements of an MIS field effect transistor having source and drain regions 18 and 20 of opposite conductivity type to that of the major portion of semiconductor body 10. Regions 10 and 20 define a channel region 22 whose conductivity is modulated in accordance with charges in the insulator overlying it. For this purpose the source and drain regions 18 and 20 are connected across one or more circuit components 24 that include means for supporting a current in the channel 22 as well as the utilization device or indicator for responding to or indicating the state of the channel current modulation.

The semiconductor body 10 may be of any known semiconductor material or may be of either conductivity type. Semiconductor 10, particularly at surface 11, should be suitable for carrier injection into the insulator 12 such as by a tunneling mechanism. For this purpose it should preferably be polished smooth. For convenience and in order to describe the invention in accordance with present day semiconductor device fabrication technique the semiconductor body 10 may be considered to be of silicon as is used in the fabrication of semiconductor devices and integrated circuits. Other semiconductor materials such as gallium arsenide and germanium may also be used. Furthermore, in accordance with an improved form of the invention the MIS field effect transistor is of a P-channel type.

The insulator layer 12 covers at least the portion of surface 11 between the source and drain regions 18 and 20. The material of the insulator layer 12 is selected from insulating materials that provide a leftward leaning hysteresis loop characteristic curve for variation of the net charge in the insulator with respect to changes in bias potential across the semiconductor body and electrode layer.

In accordance with a preferred form of the invention, the insulator 12 includes the layer portions 12*a*, 12*b* and 12*c*. Layer portion 12*a* is of silicon dioxide, layer portion 12*b* is of silicon nitride and layer portion 12*c* is of silicon dioxide.

The electrode layer 14 may be of any known highly conductive material. Conveniently for ease in fabrication it may be a vacuum deposited aluminum or other metal. In the depicted field effect transistor example, this layer is also referred to as the gate electrode.

The bias source 16 may be any known potential source variable continuously or in steps and being capable of applying either positive or negative potentials to the electrode layer 14 of the respective semiconductor body 10. A single polarity source with means for reversing a polarity of connection may be used. The range of positive and negative values over which the source should be able to traverse should be typically, depending upon properties of the insulator 12, in the range from about 15 to 80 volts in both positive and negative directions. The bias source 16 may contain or be controlled by any suitable signal control means such as those related to the central processor of a computer. The bias source 16 need only supply a small current, sufficient to maintain a charge transfer process in insulator 12. Typically only microamperes of current are sufficient for device elements under about 10 square mils area.

The nature of the source and drain channel configuration may be any of those known in the present MIS field effect transistor construction. Illustrated are source and drain regions 18 and 20 as may be formed by selective diffusion such as through an oxide mask. There may also be used thin film transistor structures. Additionally the charge responsive means may be a bipolar transistor having a junction terminating under the insulating layer 12 so that the junction characteristics and, hence, the gain of the transistor can be influenced by the charge in the insulator 12. As a further alternative, the charge responsive means may be a PN junction diode located under the insulator 12. A characteristic of the diode junction such as its breakdown voltage will be influenced by the insulator charge. A plurality or array of charge responsive semiconductor elements including those in accordance with this invention as well as those described in the above-mentioned copending application and, if desired, conventional elements may be formed in a unitary body by known integrated circuit techniques.

The nature of the circuit elements generally indicated by reference numeral 24 may be like any of those known for use in the particular type of charge responsive device employed in the structure. The means 24 may include or be ultimately linked to some known form of computer processing, readout or display apparatus.

Figure 2:
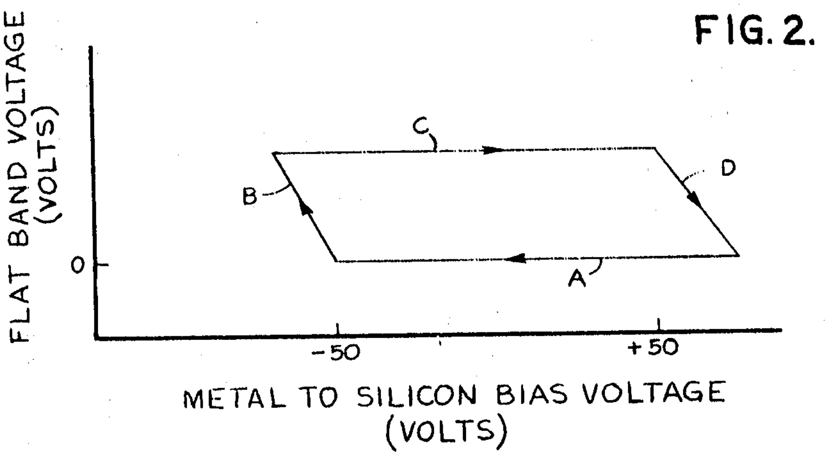
FIG. 2 is a curve showing measured values for the variations of flat band voltage with respect to metal-semiconductor bias potential for structures like those of FIG. 1.

FIG. 2 shows typical results of any Monos structure in accordance with this invention where the semiconductor was of N-type conductivity silicon the initial oxide layer was thermally grown to a thickness of about 500 Angstroms, the silicon nitride layer portion at a thickness of about 1,000 Angstroms, the subsequent oxide layer at a thickness of about 100 Angstroms and the electrode layer was of aluminum. Starting with zero bias voltage increasingly negative bias potential was applied to a maximum magnitude of about 50 to 60 volts and then the potential was varied to a similar positive magnitude with return to zero. As shown charge storage effects occurred at 50 volts and about 50 volts. The curve shows a substantially constant flat band voltage to the critical value of negative bias (portion A). For voltages increasingly negative in the critical voltage flat band voltage increases linearly with applied bias in curve portion B. With reduction toward zero and toward more positive values of bias no change in flat band voltage occurred in curve portion C until some critical positive voltage was reached. For more positive bias the flat band voltage decreased in curve portion D and after one cycle bias application hysteresis loops were reproducible.

A full understanding of the physical phenomenon occurring in the structure that result in the described characteristic is not now available. It is supposed that the utilization of the additional oxide layer permits carrier injections in the metal electrode resulting in additional charges trapped in the nitride layer. This however may not be a correct explanation or one that is entirely consistent with the explanation of the present understanding of the two layer oxide-nitride structure. Therefore the present invention is considered an anomaly not suggested by the prior work. The utilization of structures in accordance with this invention does not require a full understanding of the physical mechanisms involved in the devices' operation.

In understanding the various forms which the invention can take as well as the background of the invention reference should be made to the before mentioned copending application and also to copending application Ser. No. 616,695, filed Feb. 16, 1967 and now abandoned by Chu, Gruber and Szedon for further description of silicon oxide-silicon nitride insulator layers and methods for their preparation and are suitable for use in the practice of this invention. In general it is convenient to employ thermal oxidation for the initial layer adjacent semiconductor and any known form of pyrolytic depositions for the layer adjacent the metal electrode. In the general case the second layer of three layer insulators preferably of a higher dielectric constant by at least a factor two than the other two layers and should have deep carrier traps that can be charged and discharged. It should also be substantially free of polarization mechanisms canceling the effect of trapped charge and dielectric breakdown strength capable of supporting field required for tunneling through the barrier insulator. The barrier insulator adjacent semiconductor should be substantially free of traps for carrier injected from the semiconductor while that adjacent the metal electrode should be substantially free of traps for carriers injected from that element and both should have a much lower dielectric constant than the intermediate insulator to sustain a greater fraction of the applied field.

The preferred range for the thickness of each of the layers in the triple layer structure is from about 50 Angstroms to about 600 Angstroms for the initial silicon oxide layer and about 50 Angstroms to about 1,000 Angstroms of the silicon nitride layer. The subsequent silicon dioxide layer may have a thickness within the above-mentioned range of the initial silicon oxide layer. These ranges of thicknesses are nominal and are not limiting but are those considered convenient from the point of view of fabrication as well as with respect to convenient values of voltage with which the devices may be operated.

It is therefore seen that structures in accordance with this invention permit operation by polarizing voltages opposite those of the former two-layer oxide nitrides structures. In some applications it may be desirable to have devices of both types on the same substrate requiring no difference in semiconductor structure but merely applying layers in selected patterns to provide the three layer structures where desired and a two layer structure elsewhere.

While the present invention has been shown and described in a few forms only it will be apparent that various changes in the modification may be made without departing from the spirit and scope thereof.

I claim as my invention:

1. A solid-state memory element comprising:

a semiconductor body;

an insulator layer on a surface of said body; said insulator body consisting of a first layer of silicon dioxide on said semiconductor body, a second layer of said silicon nitride on said first layer, and a third layer of silicon dioxide on said second layer;

an electrode layer on said insulator layer remote from said body;

means for establishing in said insulator a reproducible leftward leaning hysteresis loop characteristic curve for variation of the net charge in the insulator layer with respect to changes in bias potential ($V_{MS}$) applied across said semiconductor body and electrode layer;

said means for establishing said hysteresis loop characteristic curve including a bias potential source connected across said electrode layer and said semiconductor body, said source being variable over a range of DC potentials from zero up to from about 15 volts to about 80 volts in both positive and negative directions, with the potential at said semiconductor body being the reference potential.

2. The subject matter of claim 1 wherein: said insulator characteristic curve includes a first portion of substantially constant net insulator charger for negatively increasing $V_{MS}$ down to a critical value ($V_C$) of $V_{MS}$, a second portion of substantially linearly increasing net insulator charge with negatively increasing $V_{MS}$, relative to $V_C$, to an arbitrary maximum negative value (max. $V_{MS}$) of $V_{MS}$ below the breakdown voltage of said insulator layer, a third portion of substantially constant net insulator charge for more positive, and less negative, $V_{MS}$ compared with maximum $V_{MS}$ up to a positive critical value ($V_{C'}$) of $V_{MS}$, a fourth portion of decreasing net insulator charger with more positive $V_{MS}$ than $V_{C'}$ until the net insulator charge is the same as said first portion.

3. The subject matter of claim 1 wherein:

said semiconductor body includes at least one means electrically responsive to changes in the charge in said insulator.

4. The subject matter of claim 3 wherein: said semiconductor body includes first and second regions in said surface forming first and second PN junction with the underlying portion of said body; said insulator layer covers at least a portion of said surface between said first and second regions; and metal electrode layer covers at least a portion of said insulator layer that covers said portion of said surface; means to make electrical contact to each of said first and second regions being controllable in accordance with the net insulator charge in said insulator layer.

5. The subject matter of claim 1 wherein: said semiconductor body is of silicon, said first layer has a thickness of from about 50 Angstroms to about 500 Angstroms, said second layer has a thickness of from about 50 Angstroms to about 1,000 Angstroms, and said third layer is thinner than said first layer.

6. The subject matter of claim 1 wherein: said first layer portion adjacent said semiconductor has a first dielectric constant and is substantially free of carrier traps, said second layer portion on said first layer portion has a second dielectric constant greater than said first dielectric constant by at least a factor of two and has deep carrier traps, and said third layer portion has a third dielectric constant less than said second dielectric constant by at least a factor of two.